United States Patent [19]

Kai et al.

[11] Patent Number: 5,018,147
[45] Date of Patent: May 21, 1991

[54] BIT MASK GENERATOR

[75] Inventors: Naoyuki Kai, Tokyo; Masahide Ohhashi, Yokohama; Tsutomu Minagawa, Fujisawa, all of Japan

[73] Assignee: Kabushiki Kaisha Toshiba, Kawasaki, Japan

[21] Appl. No.: 301,675

[22] Filed: Jan. 26, 1989

[30] Foreign Application Priority Data

Jan. 30, 1988 [JP] Japan .................................. 63-20316

[51] Int. Cl.$^5$ ............................................ G06F 11/10
[52] U.S. Cl. ................................................ 371/49.1
[58] Field of Search ................ 371/49.1, 49.2; 382/33

[56] References Cited
U.S. PATENT DOCUMENTS 4,556,978  12/1985  Kregness et al. ................... 371/49.1
4,903,219   2/1990  Reynolds et al. ................... 371/51.1

*Primary Examiner*—Charles E. Atkinson
*Attorney, Agent, or Firm*—Finnegan, Henderson, Farabow, Garrett, and Dunner

[57] ABSTRACT

A bit mask generator comprises partial mask generators for generating partial mask data corresponding to a plurality of blocks obtained by dividing input data, and parity correction circuits for correcting the partial mask data in accordance with a parity input and generating parity outputs. Each of the partial mask generators includes a plurality of first exclusive OR gates each of which receives bit data of a corresponding block as one input and input data of an LSB (Least Significant Bit) or an output of a lower-bit first exclusive OR gate as the other input. Each of the parity correction circuits includes a plurality of second exclusive OR gates each of which receives as one input the partial mask data generated by the partial mask generator of a corresponding block and as the other input a parity generated by a lower-bit parity correction circuit. An output from each second exclusive OR gate is generated as mask data of the corresponding block, and an output from the MSB (Most Significant Bit) second exclusive OR gate is generated as the parity.

15 Claims, 10 Drawing Sheets

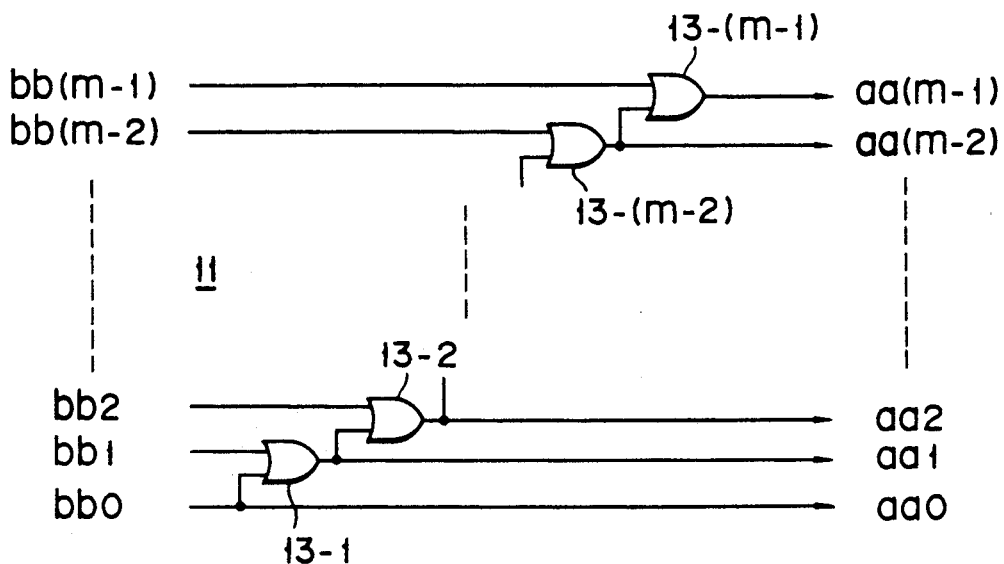
FIG. 10
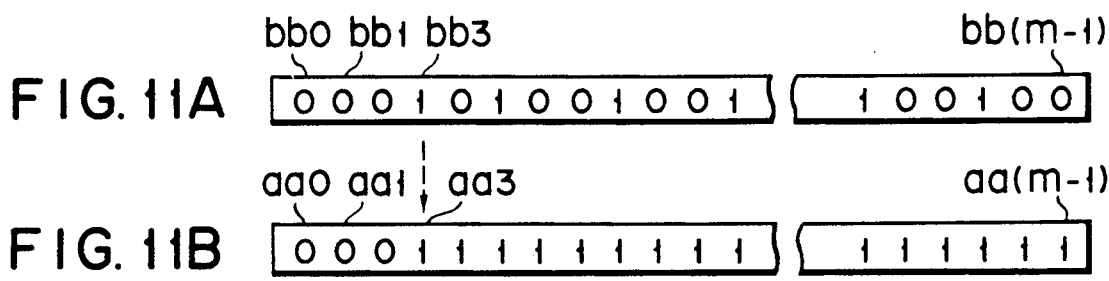
FIG. 11A
FIG. 11B
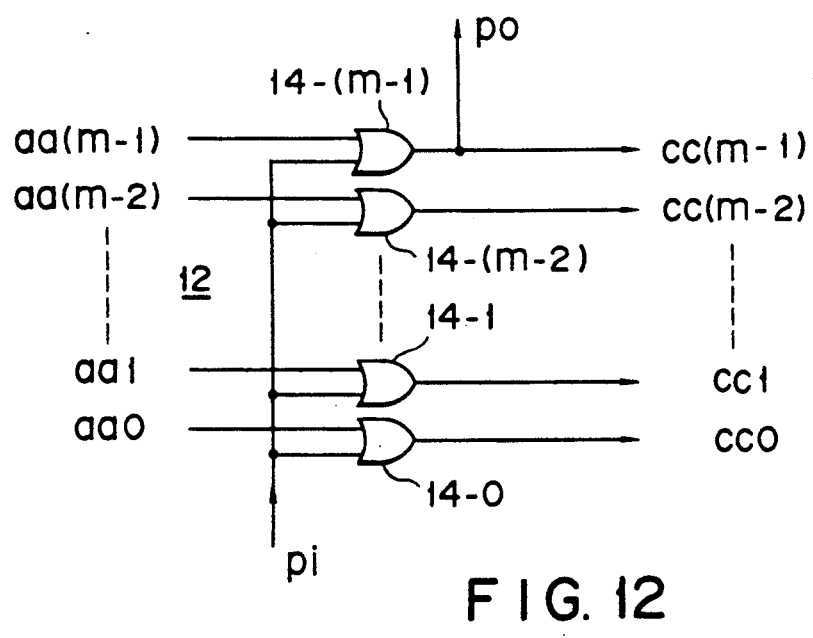
FIG. 12

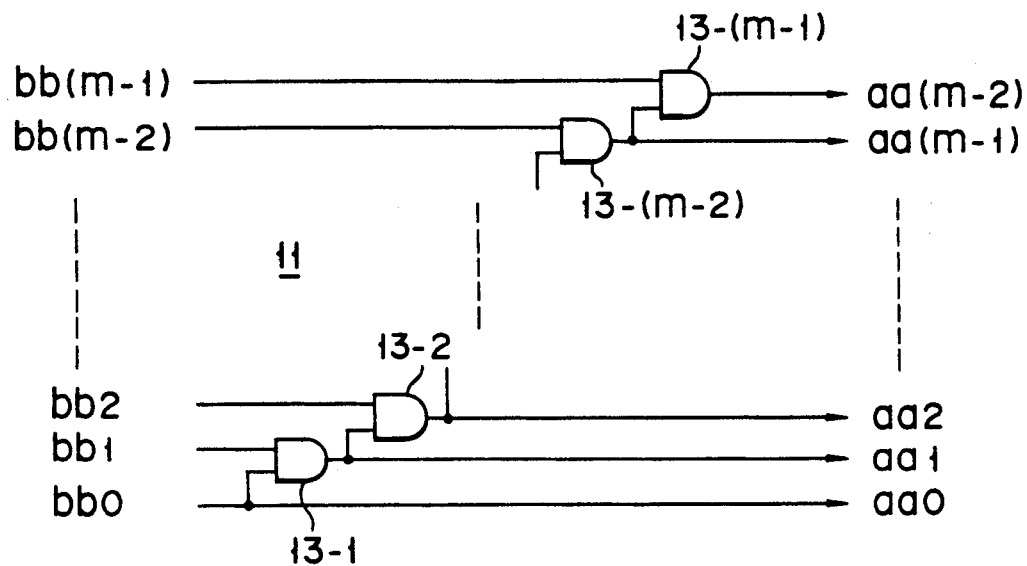
FIG. 13
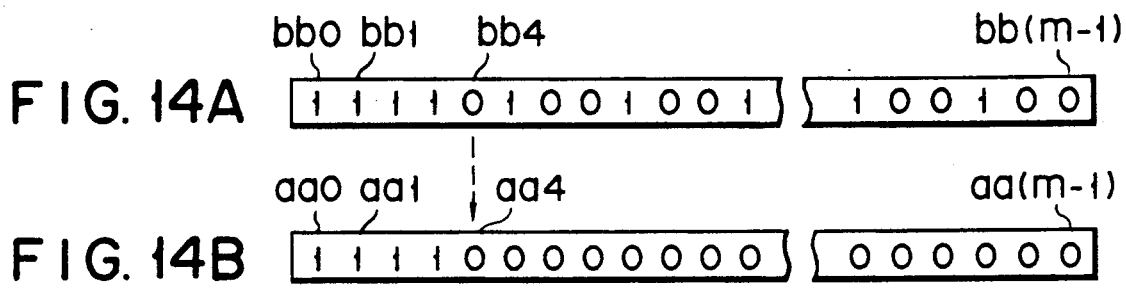
FIG. 14A
FIG. 14B
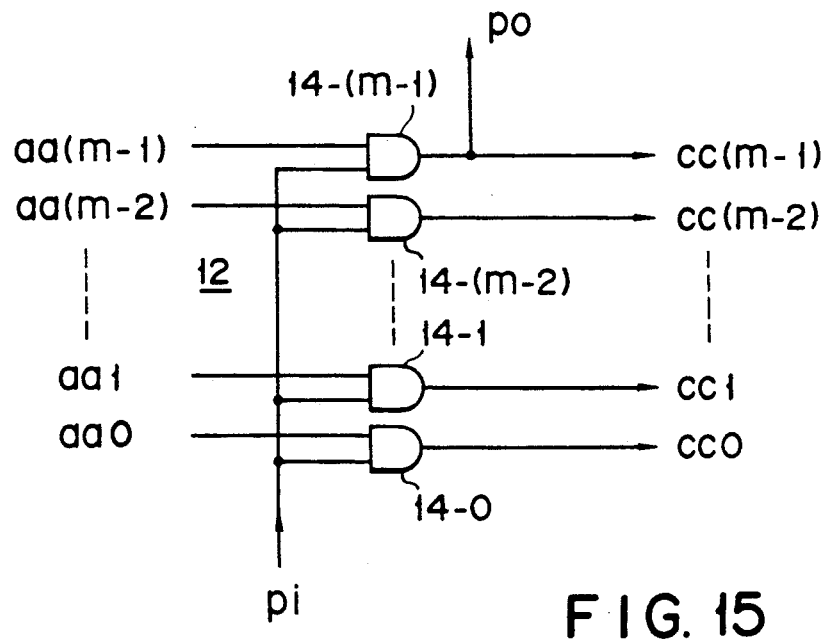
FIG. 15

BIT MASK GENERATOR

BACKGROUND OF THE INVENTION

1. Field of the Invention

The present invention relates to a bit mask generator for generating a bit mask pattern of a plurality of bits used in pasting in the field of graphics.

2. Description of the Related Art

In the field of graphics of a bit mask system, in order to paint a given graphic pattern, a pattern must be formatted such that logic "1"s in n-bit (n is a positive integer) data are paired, and logic "1"s are inserted between the pairs. For example, n-bit input data is given as $b0, b1, \ldots, b(n-1)$, as shown in FIG. 8A. In this case, a bit mask pattern given by $c0, c1, \ldots, c(n-1)$ shown in FIG. 8B can be generated by exclusive OR products (to be referred to as XOR products hereinafter) as follows:

$$\left.\begin{array}{l} c0 = b0 \\ c1 = b0 \oplus b1 \\ \vdots \\ c(i) = b0 \oplus b1 \oplus \ldots \oplus b(i-1) \oplus b(i) \\ c(n-1) = b0 \oplus b1 \oplus \ldots \oplus b(n-1) \end{array}\right\} \quad (1)$$

Equations (1) are equivalent to equations (2):

$$\begin{array}{l} c0 = b0 \\ c1 = c0 \oplus b1 \\ \vdots \\ c(i) = c(i-1) \oplus b(i) \\ \vdots \\ c(n-1) = c(n-2) \oplus b(n-1) \end{array} \quad (2)$$

When calculations defined by equations (2) are to be performed by a combination circuit, a circuit as shown in FIG. 9 is used. In this circuit, bit data $c1$ is generated when bit data $c0\ (=b0)$ and $b1$ are input to XOR gate 30-0. Bit data $c2$ is generated when bit data $c1$ and $b2$ are input to XOR gate 30-1. Similarly, bit data $c(n-1)$ is generated when bit data $c(n-2)$ and $b(n-1)$ are input to XOR gate 30-$(n-1)$.

In a conventional circuit shown in FIG. 9, a maximum of $(n-1)$ XOR gates must be used to produce pattern $c(i)$ from input pattern $bi\ (i=0, 1, \ldots, n-1)$. If the delay time of each XOR gate is given as $\tau$, a total delay time is $(n-1)\times\tau$. In a conventional arrangement, when the number of bits constituting input data is increased, the time required for generating a mask pattern is prolonged, and mask patterns cannot be generated at high speed.

SUMMARY OF THE INVENTION

The present invention has been made in consideration of the above situation, and has as its object to provide a bit mask generator capable of generating a bit mask at high speed even if the number of bits of input data is large.

In order to achieve the above object of the present invention, there is provided a bit mask generator comprising partial mask generators for generating partial mask data corresponding to a plurality of blocks obtained by dividing input data, and parity correction circuits for correcting the partial mask data in accordance with a parity input and generating parity outputs. Each of the partial mask generators includes a plurality of first exclusive OR gates each of which receives bit data of a corresponding block as one input and input data of an LSB (Least Significant Bit) or an output of a lower-bit first exclusive OR gate as the other input. Each of the parity correction circuits includes a plurality of second exclusive OR gates each of which receives as one input the partial mask data generated by the partial mask generator of a corresponding block and as the other input a parity generated by a lower-bit parity correction circuit. An output from each second exclusive OR gate is generated as mask data of the corresponding block, and an output from the MSB (Most Significant Bit) second exclusive OR gate is generated as the parity.

In the bit mask generator, each parity correction circuit further includes a plurality of OR gates for producing OR products of mask data generated by each second exclusive OR gate and bit data of input data supplied to the corresponding partial mask generator.

In the bit mask generator, each parity correction circuit further includes a plurality of AND gates for producing AND products of mask data generated by each second exclusive OR gate and inverted data of bit data of input data supplied to the corresponding partial mask generator.

The bit mask generator according to the present invention further includes a latch circuit for latching the parity output from each parity correction circuit and a parity selector for selecting one of the parity latched by the latch circuit, an external parity input, and logic "0", and outputting the selected data as a parity.

In the bit mask generator according to the present invention, each partial mask generator is divided into a plurality of subblocks each consisting of a sub partial mask generator and a sub parity correction circuit.

In the bit mask generator according to the present invention, input data is divided into a plurality of blocks, and a partial mask generator for generating partial mask data and a parity correction circuit for generating a parity are arranged for each block. As compared with a conventional circuit for gating all input data bits through the corresponding exclusive OR gates to generate a bit mask, the number of gating operations of the input data through exclusive OR gates can be reduced.

In addition, the plurality of OR or AND gates are arranged in each parity correction circuit, and bit masks can be formed according to different logical rules.

Furthermore, the latch circuit for latching the parity output from each parity correction circuit and the parity selector are arranged to provide the following effect. Input data having a large bit length can be divided into several portions, and the same bit mask generator can be repeatedly used for the divided portions to generate a bit mask.

Moreover, the partial mask generator is divided into a plurality of subblocks each consisting of the sub partial mask generator and the sub parity correction circuit, thereby reducing the total delay time.

BRIEF DESCRIPTION OF THE DRAWINGS

FIG. 8A-8G illustrate data patterns used for explaining the operation of the bit mask generator according to the present invention and explaining that according to prior art;

FIG. 10 is a modification of the circuit shown in FIG. 2, wherein the circuit is formed of OR gates;

FIG. 11A and 11B show data patterns used for explaining the operation of the circuit in FIG. 10;

FIG. 12 is a modification of the circuit shown in FIG. 3, wherein the circuit is formed of OR gates;

FIG. 13 is another modification of the circuit shown in FIG. 2, wherein the circuit is formed of AND gates;

FIG. 14A and 14B show data patterns used for explaining the operation of the circuit in FIG. 13;

FIG. 15 is another modification of the circuit shown in FIG. 3, wherein the circuit is formed of AND gates.

DETAILED DESCRIPTION OF THE PREFERRED EMBODIMENTS

Preferred embodiments of the present invention will be described with reference to the accompanying drawings.

Figure 1:
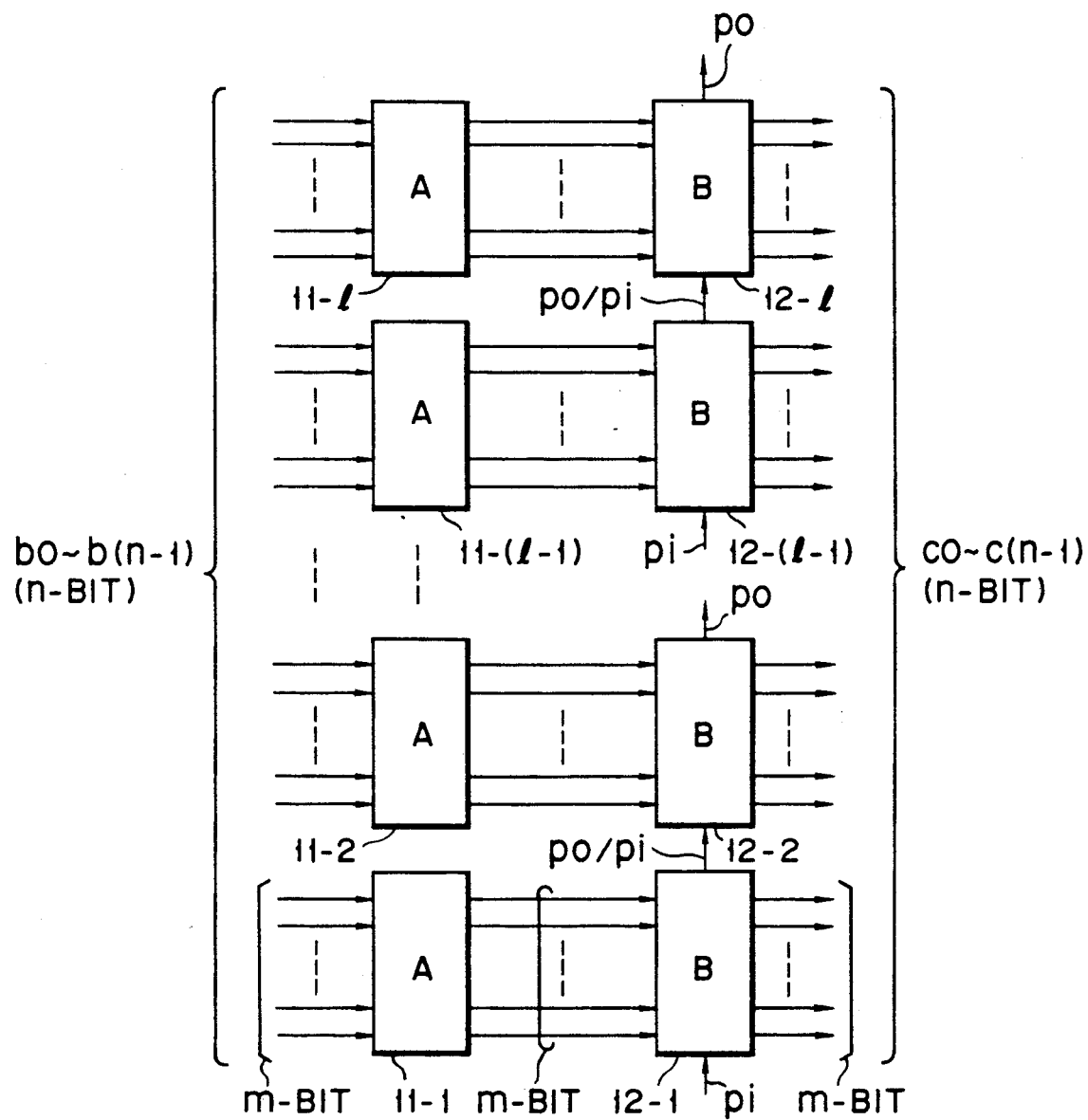
FIG. 1 is a block diagram showing a basic configuration of the bit mask generator according to an embodiment of the present invention.

FIG. 1 is a block diagram showing an arrangement of a bit mask generator according to an embodiment of the present invention.

When input data for generating a bit mask pattern is constituted by n bits consisting of b0 to b(n−1), the input data is divided into l blocks each consisting of m bits. Partial mask generators (front stage A blocks) 11-1 to 11-l and parity correction circuits (rear stage B blocks) 12-1 to 12-l respectively correspond to the l blocks. Each partial mask generator 11 receives m-bit data of a corresponding one of the l blocks and generates m-bit partial mask data. Each parity correction circuit 12 receives partial mask data generated by partial mask generator 11 of the corresponding block and a parity from a parity correction circuit of a lower bit. Each circuit 12 generates m-bit mask data and a 1-bit parity.

Figure 2:
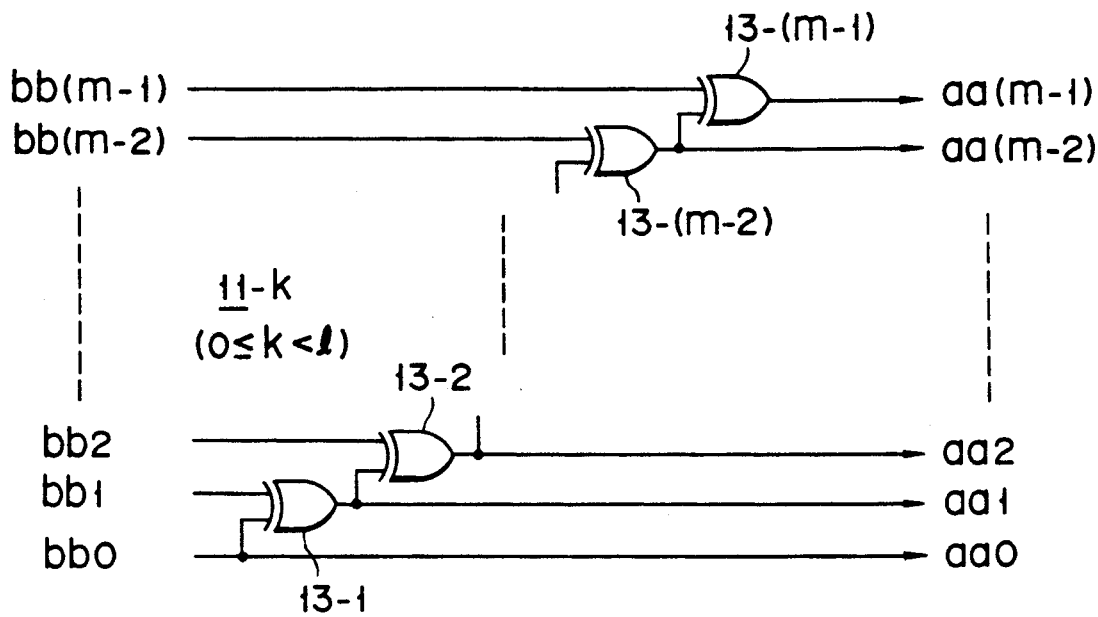
FIG. 2 shows an inner circuit of one of the front stage A blocks in the configuration of FIG. 1, wherein the circuit is formed of XOR gates.

Each partial mask generator 11 includes (m−1) XOR gates (exclusive OR gates) 13-1 to 13-(m−1) as in the kth (0≦k<l) block 11-k, shown in the circuit diagram of FIG. 2. Input data bits of the kth block are given as bb0, bb1, bb2, ..., bb(m−2), and bb(m−1). These bits are the same as bits b(kxm), b(kxm+1), b(kxm+2), ..., b(kxm+m−2), b(kxm+m−1).

In partial mask generator 11-k, input LSB data bb0 of this block appears as partial mask data aa0. Data bb0 and data bb1, one bit higher than data bb0, are input to LSB XOR gate 13-1 as one input and the other inputs, respectively. An output from XOR gate 13-1 is output as partial mask data aa1. Data bb2 and the output from XOR gate 13-1 are supplied as one input and the other input, respectively, to XOR gate 13-2 of a bit which is one bit higher than that of XOR gate 13-1. An output from XOR gate 13-2 is output as partial mask data aa2. Similarly, data bbj ((m−1)≧j≧3) and an output from XOR gate 13-(j−1) are input to XOR gate 13-j as one input and the other input, respectively. An output from XOR gate 13-j is output as partial mask data aaj.

Figure 3:
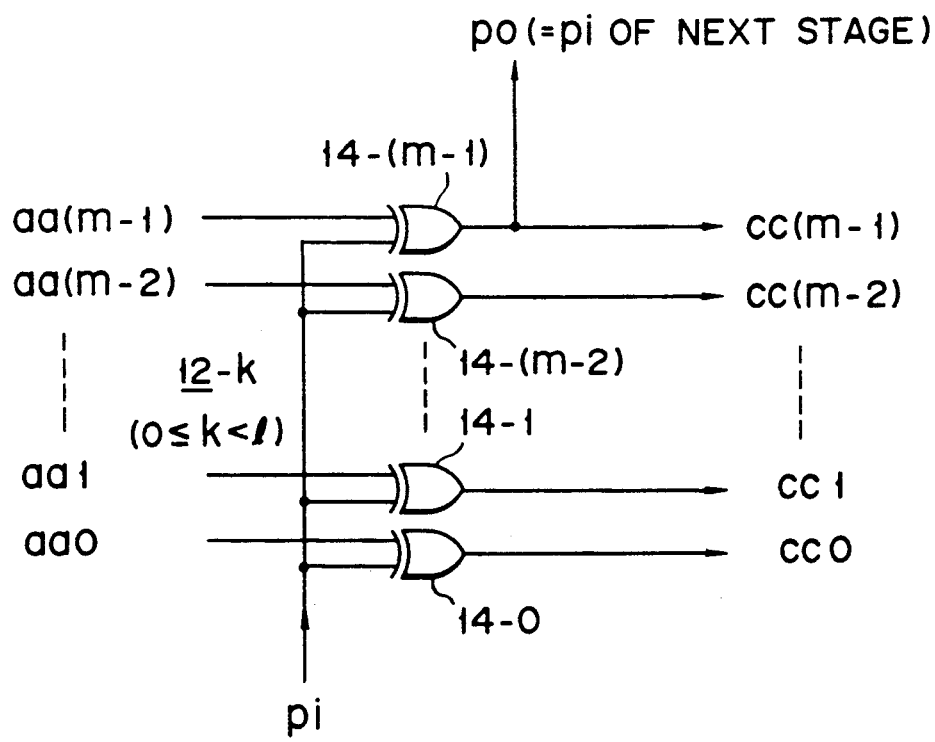
FIG. 3 shows an inner circuit of one of the rear stage B blocks in the configuration of FIG. 1, wherein the circuit is formed of XOR gates.

Each parity correction circuit 12 includes m XOR gates 14-0 to 14-(m−1) as in the kth (0≦k<l) block 12-k, shown in the circuit diagram of FIG. 3. M XOR gates 14-0 to 14-(m−1) receive partial mask data aa0 to aa(m−1) generated by partial mask generators 11-k of the corresponding blocks and parity pi. Outputs from XOR gates 14-0 to 14-(m−1) are output as mask data cc0 to cc(m−1) of this block. An output from MSB XOR gate 14-(m−1) is output as parity po. Parity input pi to the first block 12-1 is set as "0".

Partial mask generators 11-1 to 11-l generate partial mask data aa0 to aa(m−1) which are then input to corresponding parity correction circuits 12-k:

$$\left. \begin{array}{l} aa0 = bb0 \\ aa1 = aa0 \oplus bb1 \\ \cdot \\ \cdot \\ \cdot \\ aa(m-1) = aa(m-2) \oplus bb(m-1) \end{array} \right\} \quad (3)$$

Respective parity correction circuits 12-1 to 12-l receive the partial mask data generated by corresponding partial mask generators 11-1 to 11-l and parity input pi, and output mask data cc0 to cc(m−1) and parity output po:

$$\left.\begin{array}{l} cc0 = bb0 \oplus pi \\ cc1 = bb1 \oplus pi \\ \cdot \\ \cdot \\ \cdot \\ cc(m-1) = bb(m-1) \oplus pi \\ po = cc(m-1) \end{array}\right\} \quad (4)$$

Equations (3) and (4) are found to be equal to equations (2) due to a simple Boolean algebra. That is, by using the circuit of this embodiment, mask data c0 to c(n−1) as in the conventional technique can be generated.

When parity input pi of the first block 12-1 is set as "0", a bit mask pattern shown in FIG. 8B can be obtained in response to input data shown in FIG. 8A. However, when parity input pi is set to be "1", a bit mask pattern as an inverted pattern of FIG. 8B can be obtained, as shown in FIG. 8C.

Assume that the number of bits of logic "1" in the data of FIG. 8A is x, and their positions are given as y0, ..., y(x−1). If x is an even number, the pattern in FIG. 8B is:

c0 to c(y0 − 1): "0"
c(y0) to c(y1 − 1): "1"
·
·
·
c(y(x − 2)) to c(y(x − 1) − 1): "1"
c(y(x − 1)) to c(n − 1): "0"

However, if x is an odd number,
c0 to c(y0 − 1): "0"
c(y0) to c(y1 − 1): "1"
·
·
·
c(y(x − 2)) to c(y(x − 1) − 1): "0"
c(y(x − 1)) to c(n − 1) = "1"

In the embodiment of FIG. 2 and 3, the path which requires the largest number of gating operations through XOR gates is a path for generating data c(n−1). The number of series XOR gates present in this path is (l+m−1). If the delay time of each XOR gate is $\tau$ and n is 256 bits, a total delay time for generating a bit mask in a conventional technique is 255$\tau$. However, a maximum delay time of the circuit of this embodiment is (l+m−1)$\tau$. For example, if l=m=16, then a total delay time is 31$\tau$, thus greatly shortening the delay time as compared with the conventional case. As a result, the circuit of this embodiment can generate a bit mask at high speed.

Figure 4:
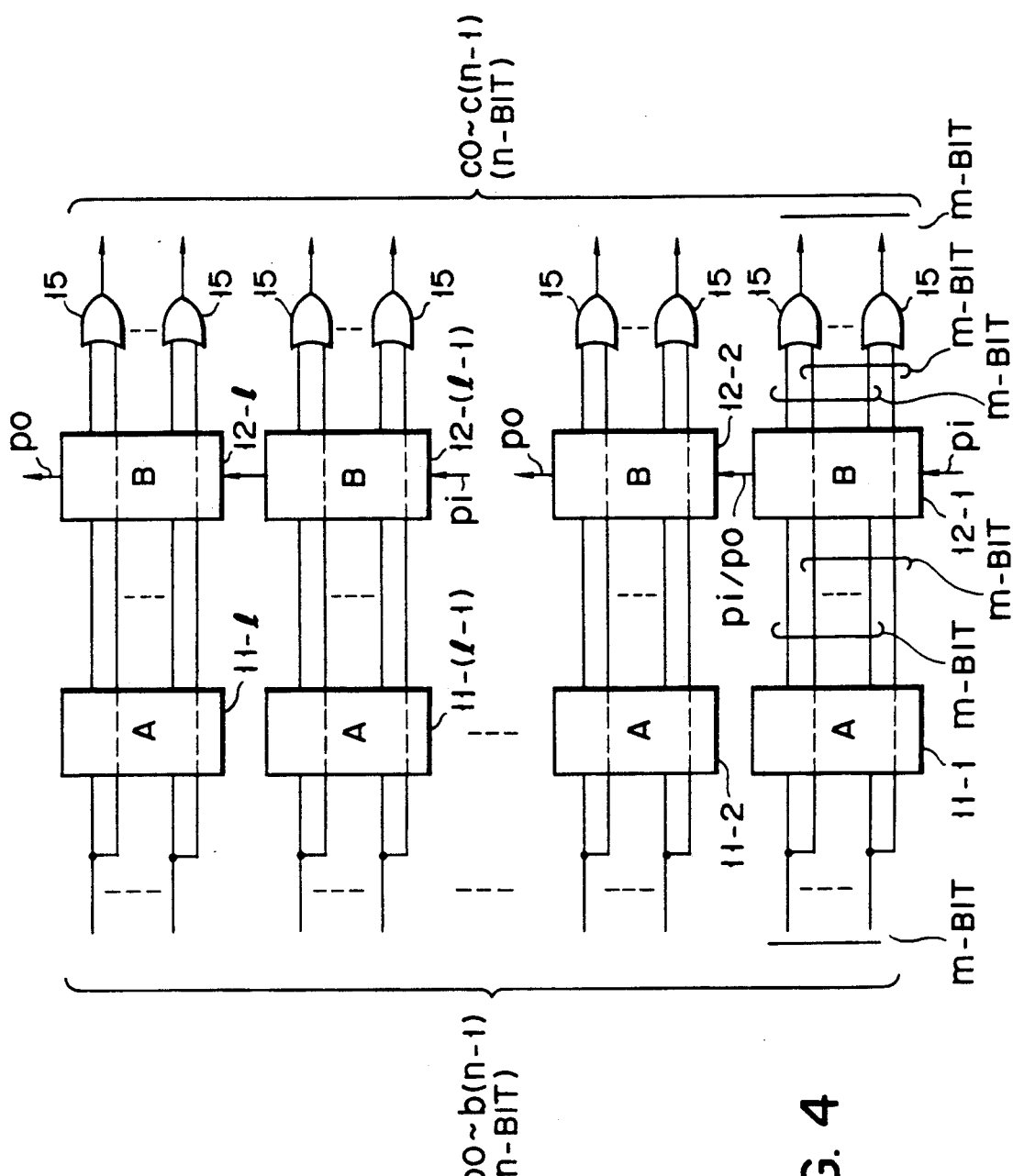
FIG. 4 is a block diagram showing a modification of the embodiment of FIG. 1, wherein an output is obtained from the logical sum of the respective inputs of the m-bit A block and the respective outputs of the m-bit B block.

FIG. 4 is a block diagram showing a circuit arrangement of a first modification of the above embodiment. In this circuit, each of parity correction circuits 12-1 to 12-l has m OR gates 15. Each bit data of the bit mask pattern generated by parity correction circuit 12 and the corresponding original input data (b0 to b(n − 1)) are ORed by these OR gates 15.

When the input data shown in FIG. 8A is supplied to the bit mask generator having the arrangement described above, a bit mask pattern shown in FIG. 8D or 8E can be obtained.

In the pattern of FIG. 8D, if x is an even number, c0 to c(y0 − 1): "0"
c(y0) to c(y1 − 1): "1"

-continued
c(y1 + 1) to c(y2 − 1): "1"
·
·
·
c(y(x − 2)) to c(y(x − 1) − 1): "1"
c(y(x − 1)) to c(n − 1): "0"

However, if x is an odd number,
c0 to c(y0 − 1): "0"
c(y0) to c(y1): "1"
c(y1 + 1) to c(y2 − 1): "0"
·
·
·
c(y(x − 2) + 1) to c(y(x − 1) − 1): "0"
c(y(x − 1)) to c(n − 1): "1"

Figure 5:
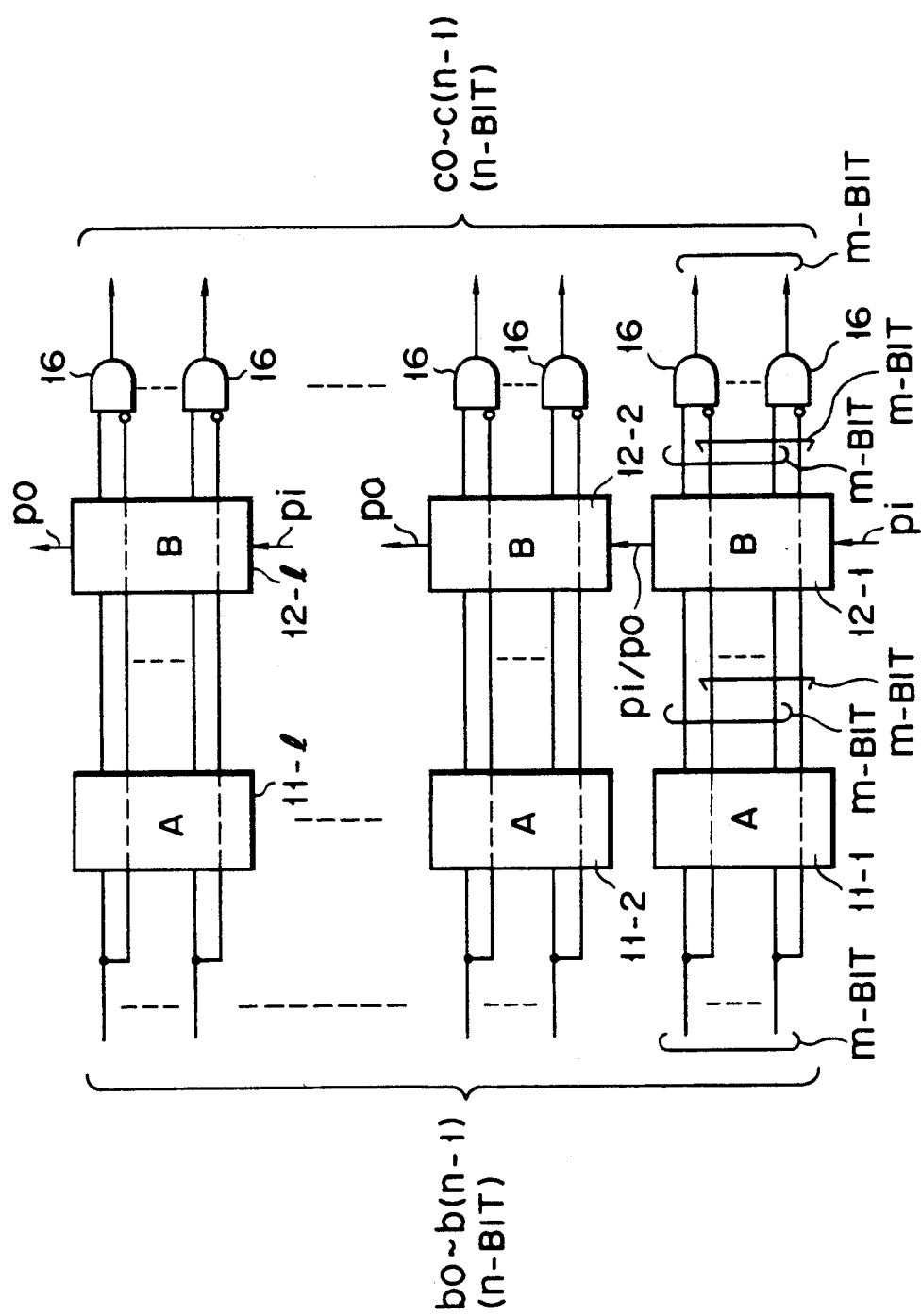
FIG. 5 is a block diagram showing another modification of the embodiment of FIG. 1, wherein an output is obtained from the logical product of the inverted signals of respective inputs of the m-bit A block and the respective outputs of the m-bit B block.

FIG. 5 is a block diagram showing a circuit arrangement of a second modification of the above embodiment. In this circuit, each of parity correction circuits 12-1 to 12-l has m AND gates 16. Each bit data of the bit mask pattern generated by parity correction circuit 12 and inverted data of the corresponding original input data (b0 to b(n−1)) are ANDed by these AND gates 16.

When the input data shown in FIG. 8A is supplied to the bit mask generator having the arrangement described above, a bit mask pattern as shown in FIG. 8F or 8G can be obtained.

In the pattern of FIG. 8F, if x is an even number, c0 to c(y0): "0"
c(y0 + 1) to c(y1 − 1)): "1"
·
·
·
c(y(x − 2)) to c(y(x − 1)): "1"
c(y(x − 1) + 1) to c(n − 1): "0"

However, if x is an even number,
c0 to c(y0): "0"
c(y0 + 1) to c(y1 − 1)): "1"
·
·
·
c(y(x − 2) + 1) to c(y(x − 1) − 1): "0"
c(y(x − 1)) to c(n − 1): "1"

Figures 6A, 6B:
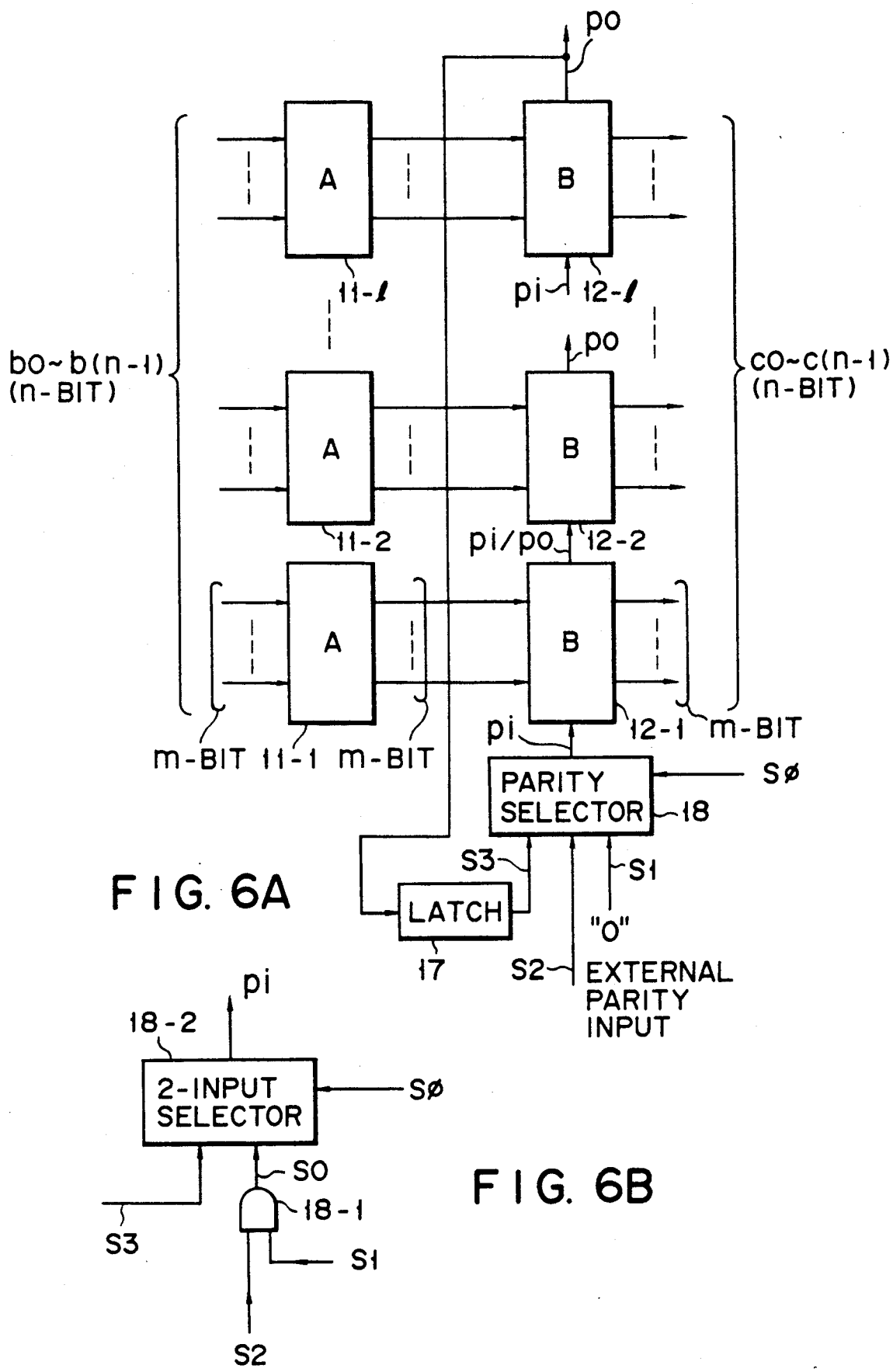
FIG. 6A is a block diagram showing still another modification of the embodiment of FIG. 1, wherein parity input pi of B block 12-1 of the least significant bit side is selected by parity selector 18 from three signals S1-S3.
FIG. 6B shows an example of the inner circuit of parity selector 18 in FIG. 6A.

FIG. 6A is a block diagram showing a circuit arrangement of a third modification of the above embodiment. This circuit further includes latch circuit 17 for latching parity output po generated by MSB parity correction circuit 12-l and parity selector 18. Parity selector 18 receives the parity S3 latched by latch circuit 17, external parity input S2, and a "0" parity S1 and selects one of the inputs. The selected data is supplied to LSB parity correction circuit 12-1.

FIG. 6B shows an example of the inner circuit of parity selector 18 in FIG. 6A. External parity input S2 is supplied to one input of AND gate 18-1. The other input of AND gate 18-1 receives "0" parity S1. ANDed output S0 from gate 18-1 is supplied to 2-input selector 18-2. Selector 18-2 is also supplied with latched parity S3. Selector 18-2 selects either S0 or S3 according to the logic level of selection signal S$\phi$, and outputs the selected signal as parity output pi.

When a bit mask generator having the arrangement as shown in FIG. 6A and 6B is used, a mask pattern having a number of bits larger than n can be generated by the following procedures.

(1) Input data bits b0 to b(q−1) larger than n bits are divided into r n-bit blocks.

(2) "0" parity S1 is selected by parity selector 18 to generate a first n-bit pattern.

(3) Parity output po generated by MSB parity correction circuit 12-1 during generation of the first n-bit pattern is latched by latch circuit 17.

(4) Parity S3 latched by latch circuit 17 is selected by parity selector 18 to generate a second n-bit pattern.

Procedures (3) and (4) are repeated until the rth mask pattern is generated.

Figure 7A:
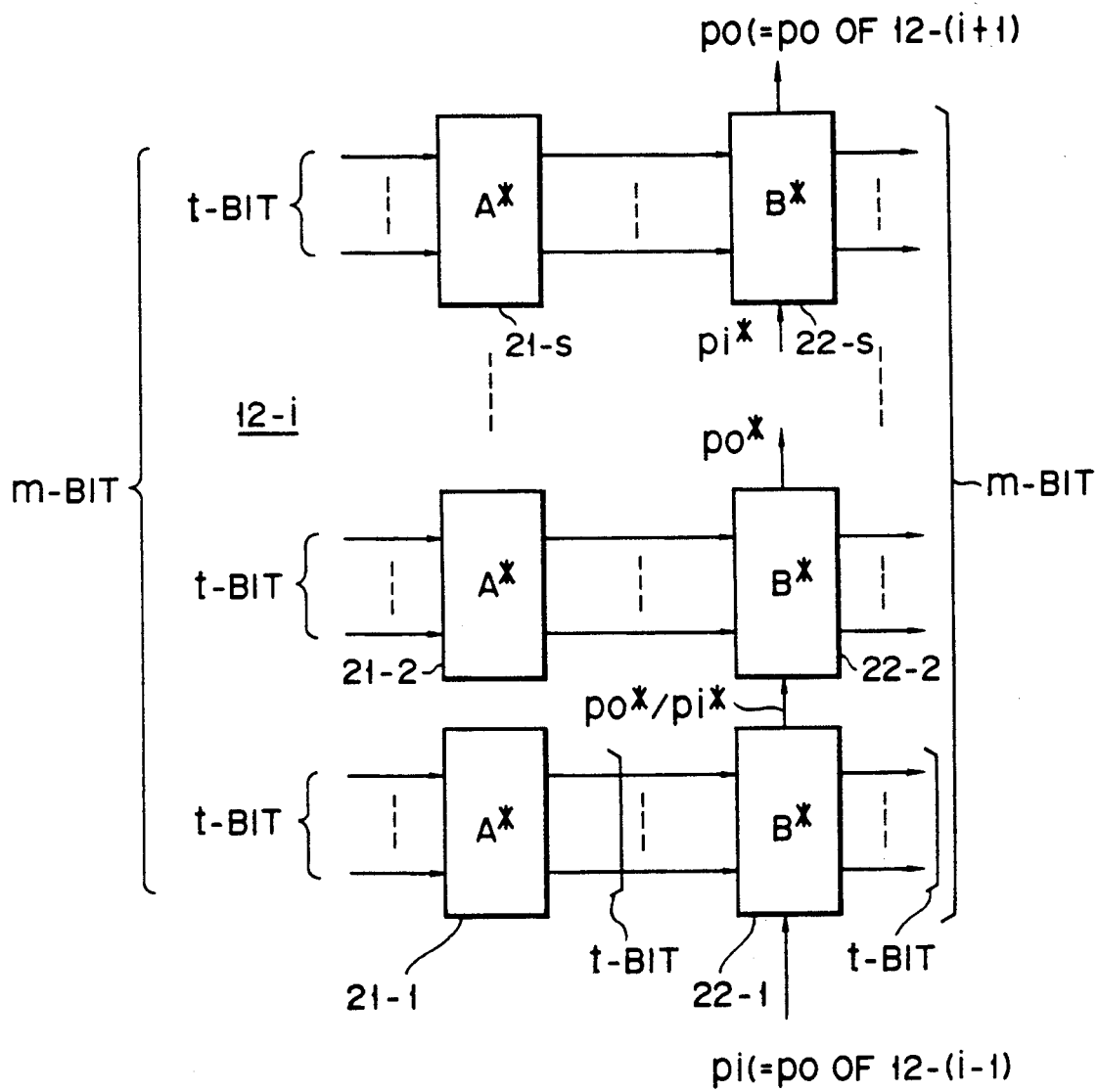
FIG. 7A shows t-bit A* blocks and t-bit B* blocks which are obtained by dividing, by number s, one block of each of the m-bit A blocks and that of the m-bit B blocks, all used in the embodiment of FIG. 1, 4, or 5.

FIG. 7A is a block diagram showing a circuit arrangement of a fourth modification of the above embodiment. In this circuit, n-bit input data is divided into l m-bit blocks, and each block is further divided into s t-bit subblocks. Each subblock comprises sub partial mask generators (front stage A* blocks in FIG. 7A) 21-1 to 21-s having the same arrangement as in FIG. 2 and sub parity correction circuits (rear stage B* blocks in FIG. 7A) 22-1 to 22-s having the same arrangement as in FIG. 3.

In the circuit of this modification, the latest or slowest data path for generating an n-bit bit mask has only (l+s+t−1) XOR gates when these gates are series-connected.

Figure 9:
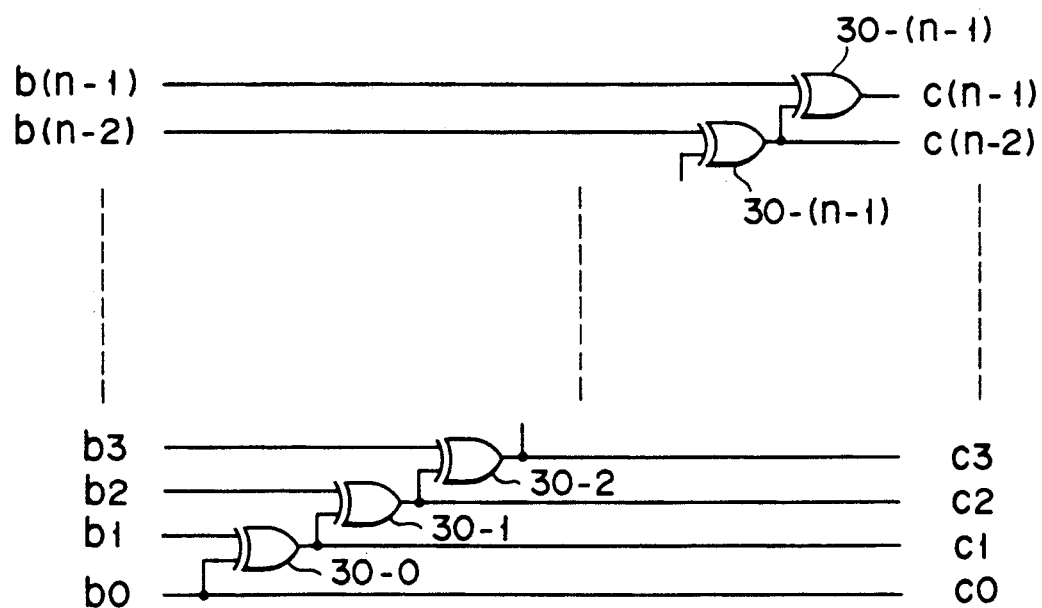
FIG. 9 shows a circuit configuration of a prior art bit mask generator.

If a delay time per XOR gate is given as τ, and n is given as 4096 (16×16×16) bits, a total delay time of the conventional circuit (FIG. 9) is 4096τ. A total delay time of the circuit of FIG. 1 is 127τ for l=m=64. However, a maximum delay time of this modification (FIG. 7A) is given by (l+s+t−1)τ and is 47τ if l=s=t=16. Therefore, the bit pattern generating speed can be greatly increased.

Figure 7B:
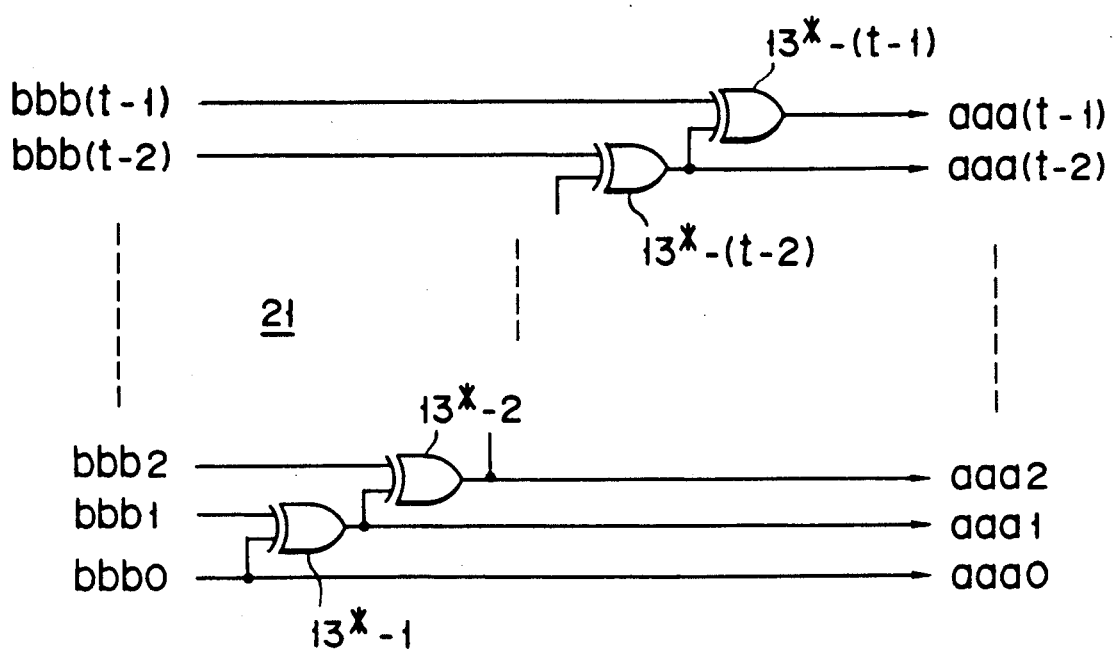
FIG. 7B shows an inner circuit of one of the front stage A* blocks in the circuit of FIG. 7A.

FIG. 7B shows an inner circuit of one of the front stage A* blocks in the circuit of FIG. 7A. Except for the number of bits used, the circuit configuration of FIG. 7B is identical to that of FIG. 2. More specifically, t pieces of XOR gates 13*-1 to 13*-(t−1) convert t-bit input data bbb0 to bbb(t−1) into t-bit output data aaa0 to aaa(t−1).

Figure 7C:
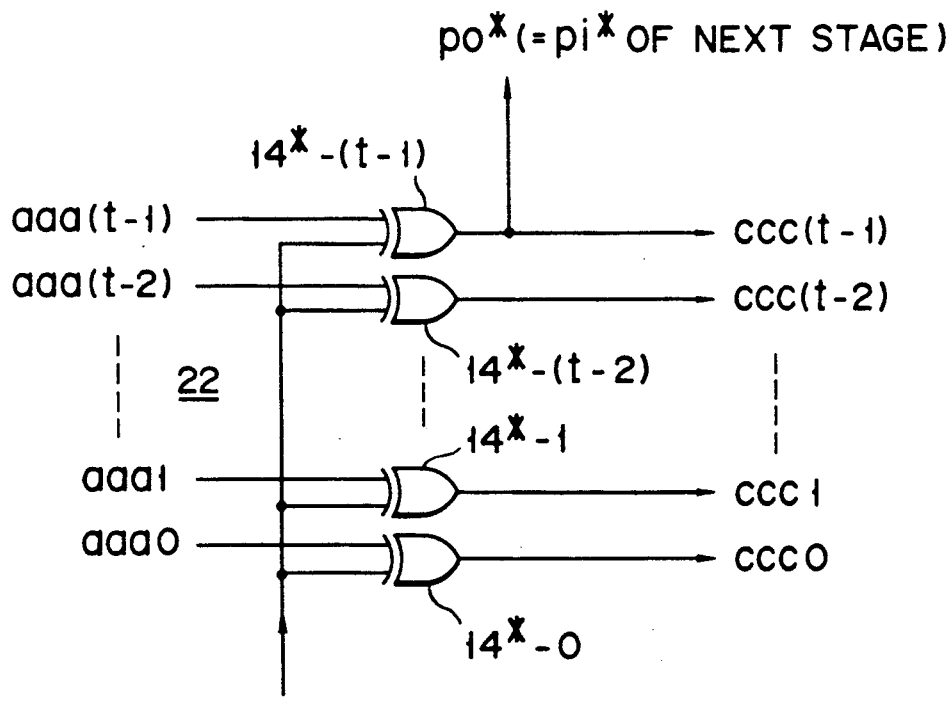
FIG. 7C shows an inner circuit of one of the rear stage B* blocks in the circuit of FIG. 7A.

FIG. 7C shows an inner circuit of one of the rear stage B* blocks in the circuit of FIG. 7A. Except for the number of bits used, the circuit configuration of FIG. 7C is identical to that of FIG. 3. More specifically, in response to 1-bit parity pi*, t+1 pieces of XOR gates 14*-0 to 14*-(t−1) convert t-bit input data aaa0 to aaa(t−1) into t-bit output data ccc0 to ccc(t−1).

FIG. 10 is a modification of the circuit shown in FIG. 2. In this modification, OR gates 13-1 to 13-(m−1) are used in place of XOR gates. When these OR gates are used, the resultant bit mask pattern differs from the bit mask pattern generated using XOR gates (cf. FIG. 8B). More specifically, when input data as shown in FIG. 11A is supplied, all output data (aaa3 to aa(m−1)), following after the first bit "1" position (bb3) of input data, become "1" as is shown in FIG. 11B. Such bit "1" output data (aaa3 to aa(m−1)) serve as mask data.

FIG. 12 is a modification of the circuit shown in FIG. 3. In place of using XOR gates, OR gates 14-0 to 14-(m−1) are used here to provide data cc0 to cc(m−1). The circuit of FIG. 12 is employed together with that of FIG. 10.

FIG. 13 is another modification of the circuit shown in FIG. 2. In this modification, AND gates 13-1 to 13-(m−1) are used in place of XOR gates. When these AND gates are used, the resultant bit mask pattern differs from the bit mask pattern generated using XOR gates (cf. FIG. 8B). More specifically, when input data as shown in FIG. 14A is supplied, all output data (aa4 to aa(m−1)), following after the first bit "0" position (bb4) of input data, become "0" as is shown in FIG. 14B. Such bit "0" output data (aa4 to aa(m−1)) serve as mask data.

FIG. 15 is another modification of the circuit shown in FIG. 3. In place of using XOR gates, AND gates 14-0 to 14-(m−1) are used here to provide data cc0 to cc(m−1). The circuit of FIG. 15 is employed together with that of FIG. 13.

Incidentally, the XOR circuits of FIG. 2 and 3, the OR circuits of FIG. 10 and 12, and the AND circuits of FIG. 13 and 15 and so on may be used together, or selectively used, according to the individual circuit design.

According to the present invention as has been described above, the bit mask generator includes the partial mask generators for dividing the input data into a plurality of blocks and generating partial mask data corresponding to the divided blocks, and the parity correction circuits for generating parities As compared with the conventional circuit for gating all input data through the exclusive OR gates, the number of gating operations of the input data through the XOR gates can be reduced, and a bit mask can be generated at high speed.

In addition, the plurality of OR or AND gates are arranged in each parity correction circuit to obtain bit masks according to different logical rules.

The bit mask generator further includes the latch circuit for latching the parity obtained by the parity correction circuit, and the parity selector. Input data having a large bit length can be divided into several portions. Each portion is processed by the same bit mask generator to obtain a bit mask.

Furthermore, each partial mask generator is divided into a plurality of subblocks. Each subblock consists of a sub partial mask generator and a sub parity correction circuit. Again, a bit mask can be generated at a higher speed.

Note that there are following Japanese Patent Applications which can be used with the present invention:

(1) Japanese Patent Application No. 63-20314, filed on Jan. 30, 1988; and (2) Japanese Patent Application No. 63-20317, filed on Jan. 30, 1988.

The inventors of the present invention are identical to the inventors of the above Japanese Patent Applications. All disclosures of the above Japanese Patent Applications and the corresponding U.S. Patent Applications are now incorporated in the specification of the present invention.

While the invention has been described in connection with what is presently considered to be the most practical and preferred embodiment, it is to be understood that the invention is not limited to the disclosed embodiment but, on the contrary, is intended to cover various modifications and equivalent arrangements included within the scope or the appended claims, which scope is to be accorded the broadest interpretation so as to encompass all such modifications and equivalent arrangements.

What is claimed is:

1. A bit mask generator for generating mask data which detects as a boundary a bit position of logic "1" in input data consisting of a plurality of bits, comprising partial mask generators for dividing the input data into a plurality of blocks, and generating partial mask data corresponding to the divided blocks; and parity correction circuits for correcting or modifying the partial mask data in accordance with a given parity input, and generating parity outputs, each of said partial mask generators being provided with a plurality of first exclusive OR gates each of which receives bit data of the corresponding block as one input, and either one of LSB input data and an output from a lower-bit side first exclusive OR gate as the other input, each of said parity correction circuits being provided with a plurality of second exclusive OR gates each of which receives as one input the partial mask data generated by the partial mask generator of the corresponding block while receiving as the other input a parity generated by a lower-bit side parity correction circuit of the corresponding block, an output from each second exclusive OR gate being generated as mask data of the corresponding block, and an output from the MSB second exclusive OR gate being output as the parity.

2. A generator according to claim 1, wherein each of said parity correction circuits further includes a plurality of OR gates for producing OR data of the mask data generated by each second exclusive OR gate and each bit of the input data supplied to the corresponding partial mask generator.

3. A generator according to claim 1, wherein each of said parity correction circuits further includes a plurality of AND gates for producing AND data of the mask data generated by each second exclusive OR gate and inverted data of each bit of the input data supplied to the corresponding partial mask generator.

4. A generator according to claim 1, further including a latch circuit for latching the parity from the MSB parity correction circuit; and a parity selector for selecting the parity latched by said latch circuit, an external parity input, and logic "0" data and outputting selected data as a parity.

5. A generator according to claim 1, wherein each of said partial mask generators is divided into a plurality of subblocks each being formed of sub-partial mask generators and sub-parity correction circuits.

6. A bit mask generator for generating mask data which detects as a boundary a bit position of logic "1" in input data consisting of a plurality of bits, comprising partial mask generators for dividing the input data into a plurality of blocks, and generating partial mask data corresponding to the divided blocks; and parity correction circuits for correcting or modifying the partial mask data in accordance with a given parity input, and generating parity outputs, each of said partial mask generators being provided with a plurality of first OR gates each of which receives bit data of the corresponding block as one input, and either one of LSB input data and an output from a lower-bit side first OR gate as the other input, each of said parity correction circuits being provided with a plurality of second OR gates each of which receives as one input the partial mask data generated by the partial mask generator of the corresponding block while receiving as the other input a parity generated by a lower-bit side parity correction circuit of the corresponding block, an output from each second OR gate being generated as mask data of the corresponding block, and an output from the MSB second OR gate being output as the parity.

7. A generator according to claim 6, wherein each of said parity correction circuits further includes a plurality of OR gates for producing OR data of the mask data generated by each second OR gate and each bit of the input data supplied to the corresponding partial mask generator.

8. A generator according to claim 6, wherein each of said parity correction circuits further includes a plurality of AND gates for producing AND data of the mask data generated by each second OR gate and inverted data of each bit of the input data supplied to the corresponding partial mask generator.

9. A generator according to claim 6, further including a latch circuit for latching the parity from the MSB parity correction circuit; and a parity selector for selecting the parity latched by said latch circuit, an external parity input, and logic "0" data and outputting selected data as a parity.

10. A generator according to claim 6, wherein each of said partial mask generators is divided into a plurality of subblocks each being formed of sub-partial mask generators and sub-parity correction circuits.

11. A bit mask generator for generating mask data which detects as a boundary a bit position of logic "1" in input data consisting of a plurality of bits, comprising partial mask generators for dividing the input data into a plurality of blocks, and generating partial mask data corresponding to the divided blocks; and parity correction circuits for correcting or modifying the partial mask data in accordance with a given parity input, and generating parity outputs, each of said partial mask generators being provided with a plurality of first AND gates each of which receives bit data of the corresponding block as one input, and either one of LSB input data and an output from a lower-bit side first AND gate as the other input, each of said parity correction circuits being provided with a plurality of second AND gates each of which receives as one input the partial mask data generated by the partial mask generator of the corresponding block while receiving as the other input a parity generated by a lower-bit side parity correction circuit of the corresponding block, an output from each second AND gate being generated as mask data of the corresponding block, and an output from the MSB second AND gate being output as the parity.

12. A generator according to claim 11, wherein each of said parity correction circuits further includes a plurality of OR gates for producing OR data of the mask data generated by each second AND gate and each bit of the input data supplied to the corresponding partial mask generator.

13. A generator according to claim 11, wherein each of said parity correction circuits further includes a plurality of AND gates for producing OR data of the mask data generated by each second AND gate and inverted data of each bit of the input data supplied to the corresponding partial mask generator.

14. A generator according to claim 11, further including a latch circuit for latching the parity from the MSB parity correction circuit; and a parity selector for selecting the parity latched by said latch circuit, an external parity input, and logic "1" data and outputting selected data as a parity.

15. A generator according to claim 11, wherein each of said partial mask generators is divided into a plurality of subblocks each being formed of sub-partial mask generators and sub-parity correction circuits.

* * * * *